US008121402B2

(12) United States Patent
Stevens

(10) Patent No.: US 8,121,402 B2
(45) Date of Patent: Feb. 21, 2012

(54) COLOR CONTROL OF PDL CIE COLOR

(75) Inventor: Michael T Stevens, Aloha, OR (US)

(73) Assignee: Xerox Corporation, Norwalk, CT (US)

( * ) Notice: Subject to any disclaimer, the term of this patent is extended or adjusted under 35 U.S.C. 154(b) by 1209 days.

(21) Appl. No.: 11/847,807

(22) Filed: Aug. 30, 2007

(65) Prior Publication Data

US 2009/0060322 A1   Mar. 5, 2009

(51) Int. Cl.
*G06K 9/00* (2006.01)
*G06F 3/12* (2006.01)
*G03F 3/08* (2006.01)

(52) U.S. Cl. ............ 382/162; 358/1.1; 358/518

(58) Field of Classification Search ......... 382/162–167; 358/518, 2.1, 1.9, 3.21, 3.01, 1.13, 520; 345/600, 345/426, 593

See application file for complete search history.

(56) References Cited

U.S. PATENT DOCUMENTS

| 5,659,638 | A  | * | 8/1997  | Bengtson ............... 382/299 |
| 5,926,185 | A  | * | 7/1999  | Vyncke et al. ............ 345/619 |
| 6,437,872 | B1 | * | 8/2002  | Davidson et al. .......... 358/1.15 |
| 6,987,588 | B2 | * | 1/2006  | Yao et al. .............. 358/3.14 |
| 7,433,103 | B2 | * | 10/2008 | Edge ................... 358/518 |
| 7,804,630 | B2 | * | 9/2010  | Nishikawa ............. 358/518 |
| 7,900,144 | B1 | * | 3/2011  | Edge et al. ............ 715/276 |
| 7,920,292 | B2 | * | 4/2011  | Stevens ............... 358/3.01 |
| 2005/0219577 | A1 | * | 10/2005 | Edge ................... 358/1.9 |

* cited by examiner

*Primary Examiner* — Andrae S Allison
(74) *Attorney, Agent, or Firm* — Pillsbury Winthrop Shaw Pittman LLP

(57) ABSTRACT

A method for processing image data includes receiving image data including an assigned color space, comparing the assigned color space of the image data to a known color space, and processing the image data using the known color space in place of the assigned color space if the difference between the known color space and the defined color space is below an acceptable threshold. The method is particularly suited for use with Adobe® PostScript® applications.

7 Claims, 4 Drawing Sheets

COLOR CONTROL OF PDL CIE COLOR

The embodiments disclosed herein relate to a color control system, and more specifically, to a method for controlling color in printing devices.

Many modern printing technologies are capable of supporting a wide array of color spaces. For example, the Adobe® PostScript® page description language (PDL) uses Color Render Dictionary (CRD) based color systems to support a wide array of color spaces. Historically however, applications on devices connected to the printing device (or on a machine integrating the printing device) typically emitted a very limited subset of possible color spaces. In fact, a number of years ago, about the only color space being used in the office market was the sRGB color space (mainly coming from PDF documents). Therefore, there was a conscious decision to optimize the pipeline from input image to output image for that color space. FIG. 1 shows how this was accomplished.

There has been a slow shift in the office market. The number of different CIE color spaces being used has been increasing. For example, the use of CIE Based DEFG spaces is becoming more common. These four dimensional color spaces are typically used for emulating printing presses. These color spaces are quite different from the sRGB color space. Therefore, when an image generated using one of these non-sRGB spaces passes through the sRGB optimized pipeline, the resulting color may be less than desirable.

The methods disclosed herein relate to intercepting the color space choice as it is being set. If the CIE color space appears to be or is substantially similar to a known RGB color space, then record that color space in lieu of the CIE space that would be assigned by the application. Additionally, if the CIE color space appears to be or is substantially similar to a known CMYK color space, then record the input space as the four-color CMYK space. Finally, if the CIE color space appears to be or is substantially similar to a known gray space, then substitute the known gray space for the application-assigned space.

Embodiments of the present invention include a method for processing image data. The method includes receiving image data including a defined color space, comparing the defined color space of the image data to a known color space, and processing the image data based upon the known color space if the difference between the known color space and the defined color space is below an acceptable threshold.

Embodiments further include calculating the differences between the value of N sample data points in the defined space and the same N sample points in the known space.

Embodiments of the present invention also include a method performed in a printing device. The method includes receiving image data including color data, assigning a color space to the image data, determining whether the assigned color space of the image data is acceptably close to one or more target color spaces, and when one of the one or more target color spaces is acceptably close to the assigned color space of the image data, substituting the one of the one or more target color spaces for the assigned color space.

Various exemplary embodiments will be described in detail, with reference to the following figures.

A printing device as used herein refers to any device that produces visible marks on paper. Printing devices include, for example, copiers, printers, or multi-function devices. Paper as used herein refers to any markable media such as, for example, paper, plastic, and textile materials.

Figure 1:
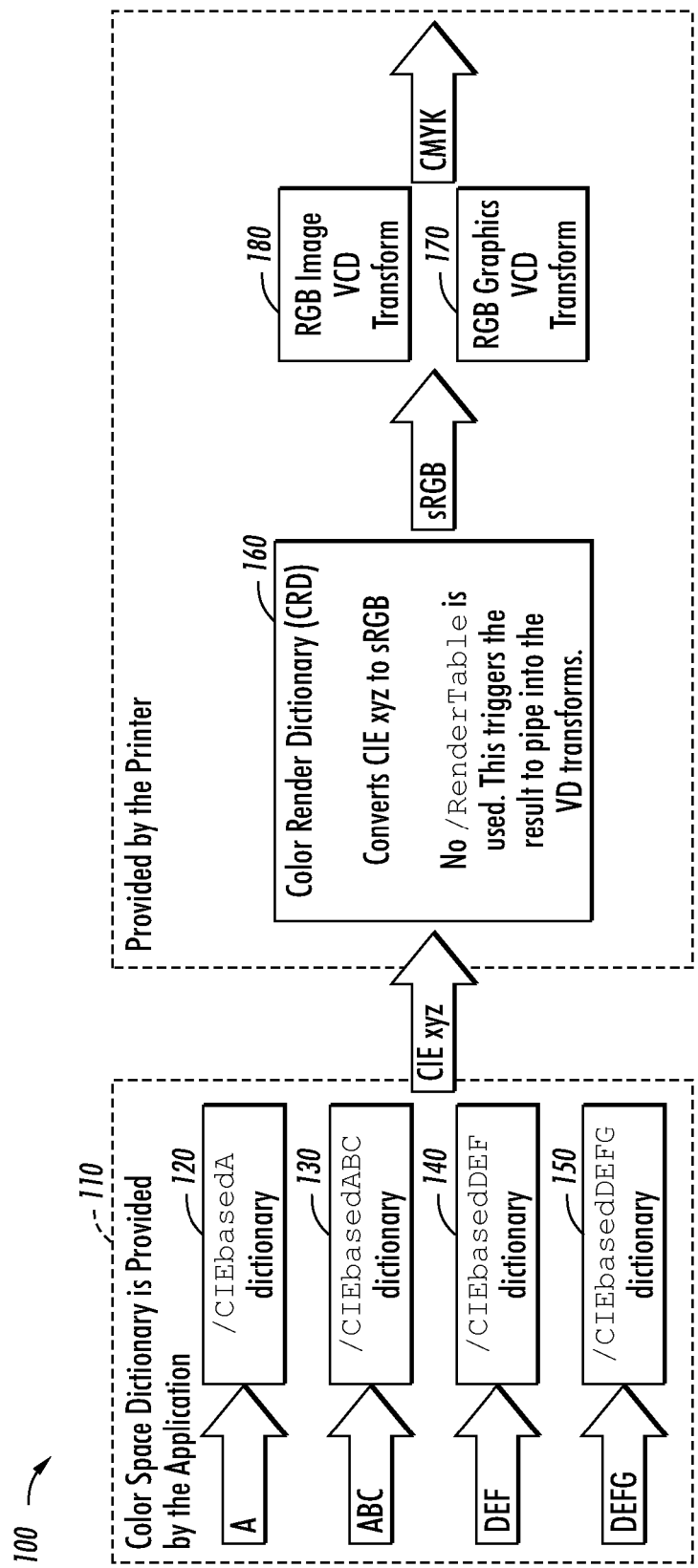
FIG. 1 is a schematic illustration of the pipeline of a PDL file from creation to CMYK conversion.

FIG. 1 schematically illustrates an example of a traditional CIE pipeline 100. FIG. 1 shows several points in a path that extends from an Adobe® PostScript® generator through a printing device. First, an application 110 creates a PostScript® document based upon input image data. The applications creating the PDL documents such as, for example, PostScript® documents, provide color space dictionaries. A color space dictionary defines the color space of the image data and specifies the transformation from the source space to the CIE xyz space. The color space of the image data can be, for example, from a scanner or an electronically stored file. The dictionaries in FIG. 1 are generally alternative examples of a dictionary an application may use. The Application may include, for example, a monocolor dictionary 120, one or more three-color dictionaries 130, 140, and/or a four-color dictionary 150. Although the application specifies the dictionary, the actual computation occurs within the printing device. The Color Render Dictionary (CRD) 160 is often set up to convert the incoming CIE xyz signal colors to an sRGB signal. The resulting sRGB signal is then transformed into a CMYK signal.

During the transformation into a CMYK signal, a variety of image enhancement algorithms may be performed on the signal. In FIG. 1, Virtual Color Device (VCD) transforms 170, 180 would incorporate these enhancements. The VCD pipelines are segmented based on object type in FIG. 1, but there may be a single pipeline or a greater number of pipelines. Multiple pipelines may be used to distinguish, for example, between images that originated from photographic material vs. images that were created wholesale. A number of RGB VCD transforms may be available on the printing device. The default RGB transform is a subjectively tuned sRGB color correction. When the input color space is a sRGB space, or something close to it, then the pipeline shown in FIG. 1 produces very nice results. However, when the input color space is not very sRGB like, then the results can be less nice.

Because the CRD and VCD transforms are optimized for sRGB transformations, the results for non-sRGB spaces can range from acceptable to bad. One approach for achieving more accurate color output includes being more pro-active further up the pipeline. Rather than let the application set the input color space, the color space can be intercepted prior to being acted on by the PostScript® interpreter.

Many printing devices contain an operator that allows the user to define the color space of input image information. Such an operator will hereinafter be referred to as the setcolorspace operator. The setcolorspace operator can be redefined to assign a color space to image data during interpretation of a PostScript® file. Specifically, the setcolorspace operator can compare the PostScript® application dictionary defined color space of the image input data against a set of known color spaces of matching dimensions. If a known color space sufficiently matches the defined space, then the input color signal will be treated as if it were acquired in the matching, known color space. The color signal would then bypass the CRD and proceed directly to the VCD transforms associated with the assigned color space.

It is noted that while the methods and examples herein are described with respect to applications using Adobe® PostScript®, the techniques described herein could be applied to other PDL applications such as Microsoft®'s XPS. Other applications such as XPS may be streamlined for interpreting received color data and processing that data through a particular color space or a limited set of color spaces. The techniques for assigning a color space as described herein may be used with these other PDL applications as well.

Figure 2:
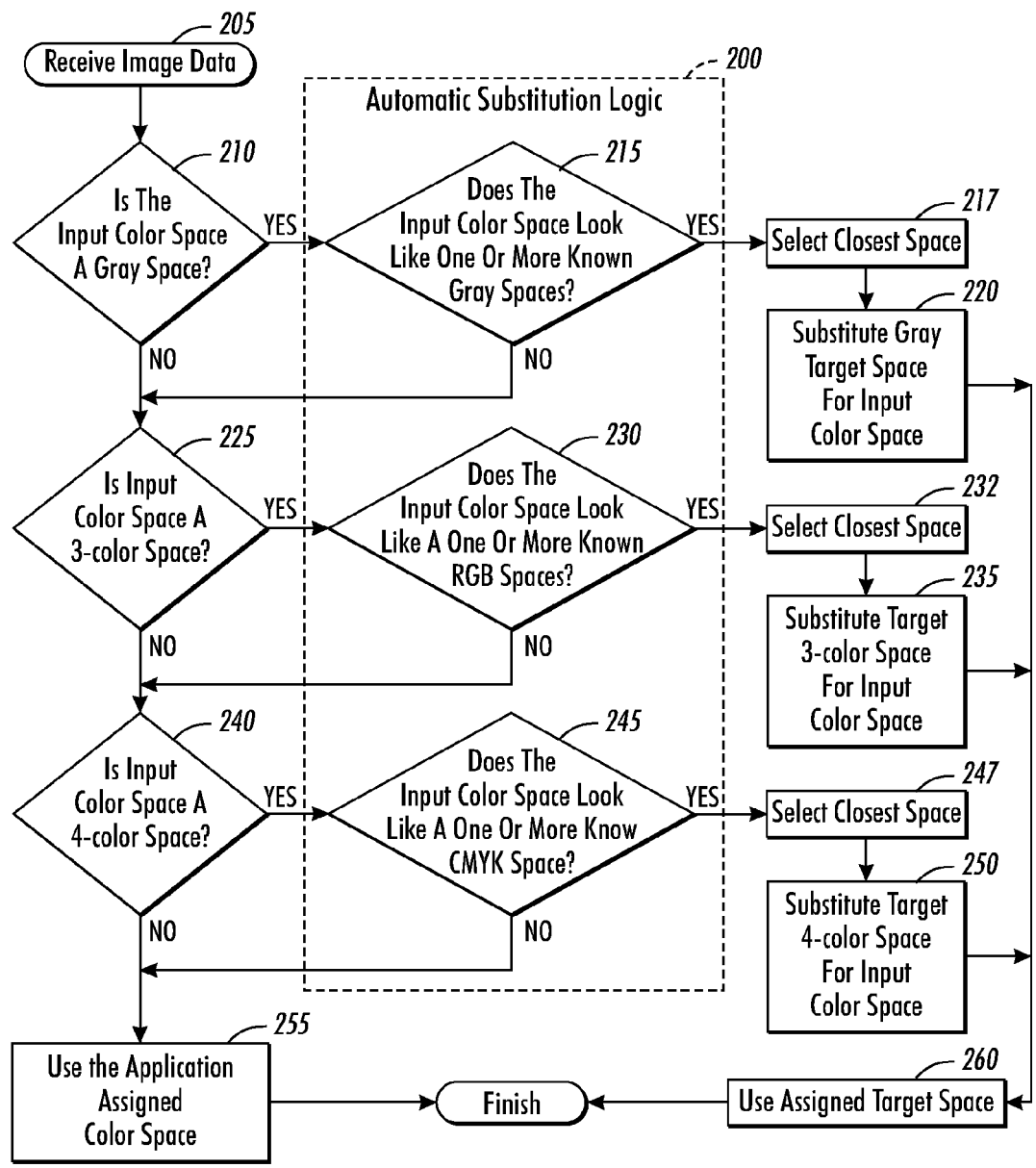
FIG. 2 is a flowchart describing an exemplary embodiment of a method for assigning a color space to received image data.

FIG. 2 shows a flow chart illustrating an algorithm 200 that may be applied to the input image data prior to or while acting on the data received from the application 110. In embodiments, the setcolorspace operator may be redefined to incorporate this algorithm. First, the printing device receives an image data signal 205. The image data typically includes a defined color space. After the printing device receives an image data signal 205 it determines 210 if the color space of the data is that of one-color against a background, i.e., a one-dimensional or "gray" space. If the data comes from a gray space, the printing device then compares the defined gray space to one or more target known gray spaces and determines 215 whether the defined gray space is sufficiently similar to at least one of the one or more known target gray spaces. If the defined color space is sufficiently close to more than one target gray space then select 217 the target gray space closest to the actual color space. Then identify 220 the selected target gray space as the space in which the image color data was obtained. The assigned target gray space is used 260 for future processing of the image data.

If the color data comprises more than one color, the printing device determines 225 if the color space of the image data is a three-color space. If the data comes from a three-color space, the printing device then compares the defined three-color space to one or more target three-color spaces and determines 230 whether the defined three-color space is sufficiently similar to at least one of the one or more known target three-color spaces. If the defined space is sufficiently close to one or more target three-color spaces, then select 232 the target three-color space closest to the actual color space. Then identify 235 the selected target three-color space as the space in which the image color data was obtained. The assigned target space is used 260 for future processing of the image data.

If the color data comprises more than three colors, the printing device determines 240 if the color space of the image data is a four-color space. If the data comes from a four-color space, the printing device then compares the defined four-color space to one or more target four-color spaces and determines 245 whether the defined four-color space is sufficiently similar to at least one of the one or more known target four-color spaces. If the defined space is sufficiently close to one or more target four-color spaces, then select 247 the target four-color space closest to the actual color space. Then identify 250 the selected target four-color space as the space in which the image color data was obtained. The assigned target space is used 260 for future processing of the image data.

If the image data does not appear to be from a one, three, or four-color space that is sufficiently similar to a known target color space, the printing device will use 255 the application assigned color space to process the data. The term "is sufficiently similar to" means within an acceptable limit of difference between the target space and the defined space and is subjective on its own. A more rigorous exemplary definition will be provided.

As will be explained in more detail subsequently, the comparison between the defined "actual" space and each target space will be formed by comparing sample points from the defined color space to sample points of the target space in a device-independent space such as, for example, CIE L*a*b*. In the present case, a space having more linear color transitions was used. The particular color space used herein is not described independently from the transformations of the input and output color space vectors. However, the exemplary comparison calculations, equation 14-25, described herein include the transformations into the particular device-independent space used.

It should be noted that the steps outlined in the flowchart of FIG. 2 may not necessarily occur in the order listed. For example, steps 210, 225, and 240 may be performed in a different order, or may be performed in a single classification step. Also, some steps, such as, for example, steps 217, 232, and 247 may not occur at all.

If a target space is assigned, then VCD transforms tailored to the assigned target space are used to process the image data signal prior to printing, thereby producing an improved output. Default VCD transforms 170 and 180 (generally sRGB-based transforms) would be replaced by VCD transforms tailored for the target space assigned to the input image signal.

Figure 3:
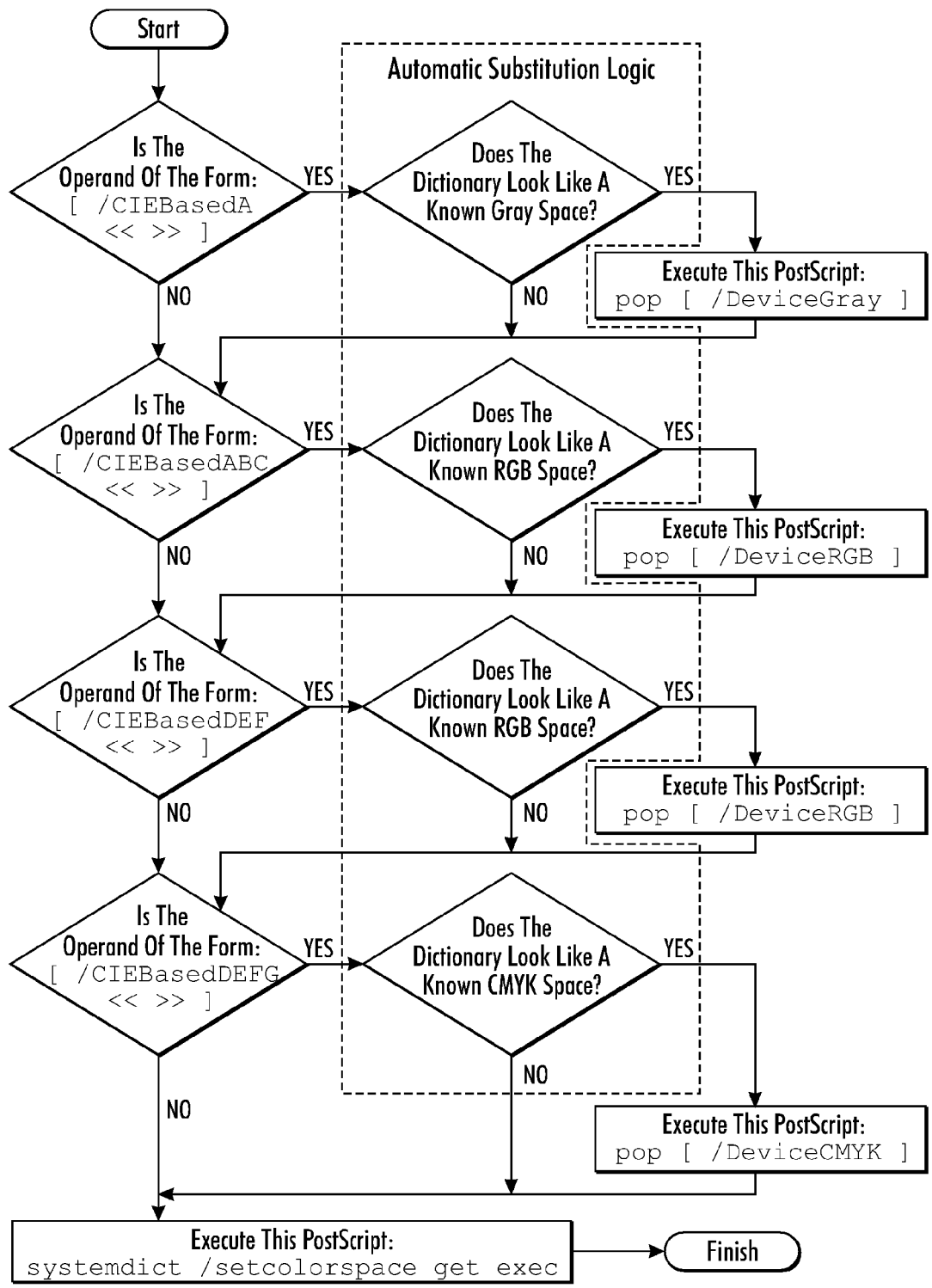
FIG. 3 is another specific exemplary embodiment of a method for assigning a color space to received image data.

FIG. 3 is a more specific exemplary implementation of the algorithm of FIG. 2 for use with an Adobe® application. The algorithm performs the tasks of the algorithm presented in FIG. 2. The logic of the algorithm is a bit more complex than that of FIG. 2. Also note in FIG. 3 that the algorithm distinguishes types of three-color signals—CIEBasedABC and CIEBasedDEF. Where detectable by the printing device, other specific categories may be used as well, and targeted matching may be performed for each of those categories.

To determine whether a target color space is sufficiently similar to the color space of the input image data, the relationship between the two color spaces should be quantified. The printing device may be programmed to work with a finite number of known color spaces. For example, the printing device may include $n_1$ known target gray spaces, $n_3$ known target three-color spaces, and $n_4$ known target four-color spaces.

$$n_1 = \text{The number of target gray spaces (e.g., /Device-Gray).} \quad (1)$$

$$n_3 = \text{The number of target three-color spaces (e.g., /DeviceRGB).} \quad (2)$$

$$n_4 = \text{The number of target four-color spaces (e.g., /DeviceCMYK).} \quad (3)$$

Given an arbitrary CIE color space, A, and a known target color space, T, one can compute a difference metric $\delta(A,T)$ that represents a measure of just how different the two color spaces are from each other.

$$\delta(A,T) = \text{A metric representing the difference between color spaces A and T.} \quad (4)$$

The metric $\delta(A,T)$ is the comparison performed in the Automatic Substitution Logic block outlined in FIGS. 2 and 3.

Typically, $\delta$ is a single function in a device-independent color space to which the incoming signal is mapped. The defined color space of the input signal and the target spaces are also mapped to the device-independent color space. If a target color space is sufficiently close to the defined color space, then the target color space can effectively be substituted for the defined color space. An advantage of doing so is that then the printer could process the signal using algorithms tailored for the target color space.

The metric used had the following three properties or constraints:

1. The metric must always yield a non-negative real number:

$$0 \leq \delta(A,T) < \infty \text{ for all values of A and T;} \quad (5)$$

2. When comparing identical color spaces, the metric should produce a zero value:

$$\delta(T,T)=0; \text{ and} \quad (6)$$

3. As A diverges from T, the value of δ(A,T) increases.

The latter quality is not easily represented by an equation, but was a constraint for the δ's used in the methods described herein. An exemplary function δ is defined in more detail in subsequent paragraphs.

In embodiments, different metrics may be used for different types of color spaces. For example, different metrics may be used to compare 1-D, 3-D, and 4-D color spaces. The metrics used should still embody the properties and constraints 1-3.

Figure 4:
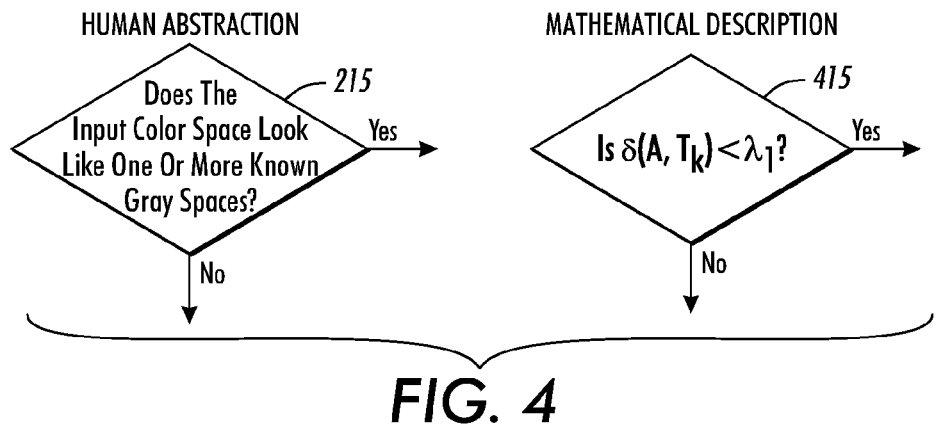
FIG. 4 shows a mathematical substitution for one of the decisions in the flowchart of FIG. 2.

The three subjective queries 215, 230, and 245 in FIG. 2 may be replaced with more precise mathematical comparisons. For example, the two logic blocks shown in FIG. 4 are equivalent. The first block 215 is the human readable abstraction of a decision shown in FIG. 2, and the second block 415 is a mathematical description of the same decision. In this representation k is an integer such that $1 \leq k \leq n_1$, and $T_k$ is the k th target gray space. $\lambda_3$ is a real number that functions as a limit constant. If $\delta(A,T_k)$ is greater than or equal to $\lambda_3$ for all k then a printing device will use the application assigned color space to process the input image data. If $\delta(A,T_k)$ is less than $\lambda_3$ for one or more target gray spaces, the target gray space yielding the lowest value will be assigned to the input image data.

Figure 5:
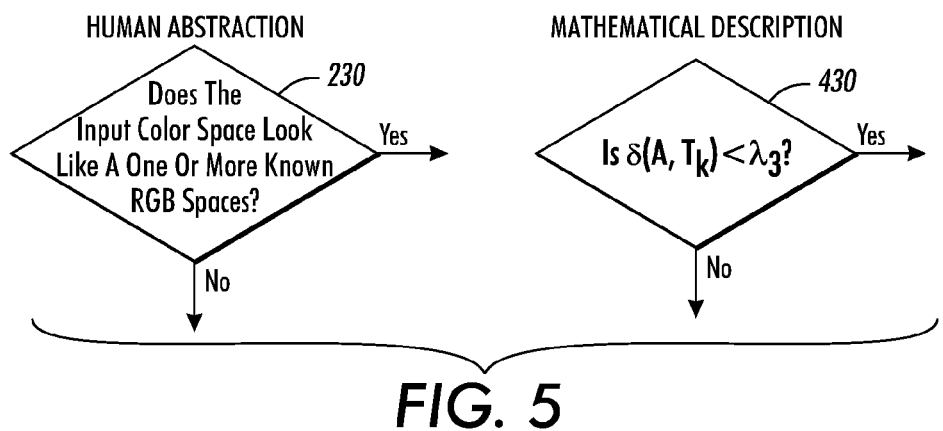
FIG. 5 shows a mathematical substitution for one of the decisions in the flowchart of FIG. 2.

Similarly in FIG. 5, the first block 230 is the human readable abstraction of a decision shown in FIG. 2, and the second block 430 is a mathematical description of the same decision. In this representation k is an integer such that $1 \leq k \leq n_3$, and $T_k$ is the k th target three-color space. $\lambda_3$ is a real number that functions as a limit constant. If $\delta(A,T_k)$ is greater than or equal to $\lambda_3$ for all k then a printing device will use the application assigned color space to process the input image data. If $\delta(A,T_k)$ is less than $\lambda_3$ for one or more target three-color spaces, the target three-color space yielding the lowest value will be assigned to the input image data.

Figure 6:
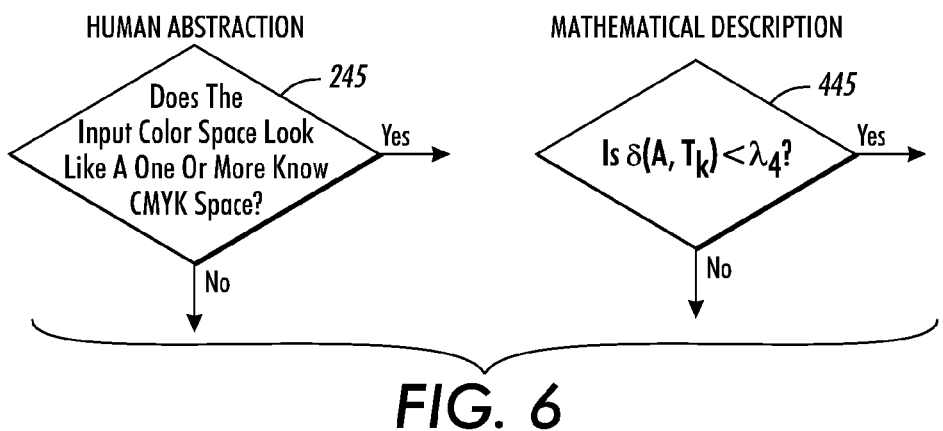
FIG. 6 shows a mathematical substitution for one of the decisions in the flowchart of FIG. 2.

Similarly in FIG. 6, The first block 245 is the human readable abstraction of a decision shown in FIG. 2, and the second block 445 is a mathematical description of the same decision. In this representation k is an integer such that $1 \leq k \leq n_3$, and $T_k$ is the k th target four-color space. $\lambda_4$ is a real number that functions as a limit constant. If $\delta(A,T_k)$ is greater than or equal to $\lambda_4$ for all k then a printing device will use the application assigned color space to process the input image data. If $\delta(A,T_k)$ is less than $\lambda_4$ for one or more four-color spaces, the target four-color space yielding the lowest value will be assigned to the input image data.

Referring back to FIG. 1, performing the substitution removes the necessity of a number of steps. The image input signal is no longer transformed into a CIE xyz signal, and the CRD 160 is bypassed entirely. The output signal would pass directly to VCDs tailored for the substituted target color space. Even for the sRGB space, the current method may result in a faster more accurate output as there is no need to convert the signal to CIE xyz and back to sRGB again.

It should be noted that while it will generally take more processing time, color space defined by the dictionary could simply be compared against every target color space regardless of dimensionality. All the comparisons are performed in the same device-independent space already. However, as the dimensionality of the defined color space is already known, it is simple enough to use that information to reduce the number of comparisons to be performed.

Depending on the needs of the user, the value of the λ's in FIGS. 4-6 may be set higher or lower to either increase or decrease the likelihood of a color space substitution. For example, for the mathematical expressions used in FIGS. 4-6, if a λ is set to zero then the chances of a substitution will be none as a substitution will only happen when δ(A,T)>0. On the other hand, if λ is set to a sufficiently large number, there will always be a substitution. In embodiments, $\lambda_1=\lambda_3=\lambda_4=1$.

The color space difference metric δ(A,T) is computed within the printing device every time a CIE color space is set within a document (this typically happens multiple times per page). PDL languages such as Adobe® PostScript® only support CIE based independent color spaces, but the methods described herein would work with non-CIE device-independent color spaces as well.

For performance reasons color space difference metric calculation should be as simple as possible. From a mathematical viewpoint, comparing two spaces involves integrating over a multi-dimensional volume. The printing device would perform this integration as a numerical approximation (finite sum). The number of samples in the sum affects the numerical accuracy of the approximation. As the number of samples decreases, so the accuracy decreases, but speed of the calculation increases. A variety of factors can influence the decision of how many points to use including accuracy requirements, processor speed and memory, variety of image data received by the printing device, etc. The accuracy required drives the decision on how many samples to use.

As it turns out, for printing devices supporting Adobe® PostScript®, not much accuracy is required for the following reason. Adobe® PostScript® CIE color space may have any white point. This is problematic. For example, the official white point for sRGB is D65. ICC profiles only support a D50 white point. If a user is using a sRGB ICC color profile, it has been converted from D65 to D50. The results of conversion process will vary depending on the chromatic adaptation model used. The chromatic adaptation model does not propagate as part of the document workflow. In fact, if it is proprietary algorithm, it may be known only to the profile creator. There are a whole host of chromatic adaptation models out there. They all produce different results. It is a daunting if not impossible task to pick a "best" method. For example, the Bradford model is currently popular. It would not be surprising to see its popularity usurped by something newer (not necessarily better) in the future. A big bucket is needed to catch all the variations on the same CIE color space. Because there are such differences in adaptation models, and such large tolerances are required, a limit is quickly approached where adding more sample points provides no new information. Therefore, very few sample points are required. In embodiments, 3 sample points were used for gray spaces, 11 sample points were used for three-color spaces, and 19 sample points were used for four-color spaces. The number of points used could certainly have been greater, but would have added additional computation time.

For the sake of computational speed, a precise comparison is not used. A precise comparison would mean taking the Euclidean distance between each sample point of the defined color space and its corresponding sample point in the target color space. To speed up the comparison, the metric, δ, is a useful approximation that can be calculated more quickly.

Up to this point, the specifics of the metric, δ, have not been discussed. The methods disclosed herein will work with any metric that fits the three requirements listed previously.

The first step is to pick N samples in the target space T.

$$N = \text{Is the number of samples in the target space T.} \quad (7)$$

Three pieces of information may be associated with each sample: the input vector $\vec{\sigma}_i$, and the output vector $\vec{\omega}_i$, and the tolerance vector $\vec{\Delta}_i$:

$$\vec{\sigma}_i \equiv \begin{bmatrix} \sigma_{i1} \\ \vdots \\ \sigma_{i\eta} \end{bmatrix} \quad (8)$$

for all samples i such that $1 \leq i \leq N$ and $\eta$ is the dimension of the input space;

$$\vec{\omega}_i \equiv \begin{bmatrix} x_{\omega i} \\ y_{\omega i} \\ z_{\omega i} \end{bmatrix} \quad (9)$$

for all samples i such that $1 \leq i \leq N$ where $x_{\omega i}$, $y_{\omega i}$, and $z_{\omega i}$ are the tri-stimulus values of the i'th sample; and $$\vec{\Delta}_i \equiv \begin{bmatrix} L_i^* \\ a_i^* \\ b_i^* \end{bmatrix} \quad (10)$$

for all samples i such that $1 \leq i \leq N$ where $L_i^*$, $a_i^*$, and $b_i^*$ are the tolerance constants of the i'th sample.

The white point of the target space T can be represented by:

$$\vec{W}_t \equiv \begin{bmatrix} x_t \\ y_t \\ z_t \end{bmatrix} \quad (11)$$

with $x_t$, $y_t$, and $z_t$ being the tri-stimulus values of the white point of the target color space t.

For every input vector $\vec{\sigma}_i$, the CIE dictionary provided can be used to compute an output vector $\vec{\Omega}_i$ for the requested CIE color space A.

$$\vec{\Omega}_i \equiv \begin{bmatrix} x_{\Omega i} \\ y_{\Omega i} \\ z_{\Omega i} \end{bmatrix} \quad (12)$$

for all samples i such that $1 \leq i \leq N$, where $x_{\Omega i}$, $y_{\Omega i}$, and $z_{\Omega i}$ are the tri-stimulus values of the i'th sample. $\vec{\Omega}_i$ is a three-dimensional vector and all the comparisons and calculations are being performed in a device-independent space. Likewise, the respective target gray spaces and four-dimensional spaces against which these spaces will be compared are also converted to a three-dimensional device-independent space representation as well.

The white point of the requested color space A can be represented by:

$$\vec{W}_A \equiv \begin{bmatrix} x_A \\ y_A \\ z_A \end{bmatrix} \quad (13)$$

with $x_A$, $y_A$, and $z_A$ being the tri-stimulus values of the white point of the requested color space A.

For each sample i it is possible to compute a vector $\vec{d}_i$ via matrix multiplication. Equation 14 contains many constants. The equation is presented in this way in order to draw attention to the simplicity (speed) of the runtime calculation. The values of the constants are specified in equations 15 through 24.

$$\vec{d}_i = \begin{bmatrix} 0 & M_{12i} & 0 \\ M_{21i} & M_{22i} & 0 \\ 0 & M_{32i} & M_{33i} \end{bmatrix} \begin{bmatrix} \left(\frac{x_{\Omega i}}{x_A} - o_x\right) \\ \left(\frac{y_{\Omega i}}{y_A} - o_y\right) \\ \left(\frac{z_{\Omega i}}{z_A} - o_z\right) \end{bmatrix} \quad (14)$$

for all samples i such that $1 \leq i \leq N$

This next group of equations defines the constants used in equation 14. To decrease runtime, equations 15-24 can be precomputed and cached prior to runtime:

$$o_{xi} = \frac{x_{\omega i}}{x_t}; \quad (15)$$

$$o_{yi} = \frac{y_{\omega i}}{y_t}; \quad (16)$$

$$o_{zi} = \frac{z_{\omega i}}{z_t}; \quad (17)$$

$$M_{12i} = \frac{116}{L_i^*} f'\left(\frac{y_{\omega i}}{y_t}\right); \quad (18)$$

$$M_{21i} = \frac{500}{a_i^*} f'\left(\frac{x_{\omega i}}{x_t}\right); \quad (19)$$

$$M_{22i} = \frac{-500}{a_i^*} f'\left(\frac{y_{\omega i}}{y_t}\right); \quad (20)$$

$$M_{32i} = \frac{200}{b_i^*} f'\left(\frac{y_{\omega i}}{y_t}\right); \quad (21)$$

$$M_{33i} = \frac{-200}{b_i^*} f'\left(\frac{z_{\omega i}}{z_t}\right). \quad (22)$$

for all samples i such that $1 \leq i \leq N$.

The function f comes from the CIE definition of the L*a*b* color space.

$$f(x) = \begin{cases} \text{if } x \leq \left(\frac{6}{29}\right)^3, \text{ then } f(x) = \frac{841}{108}x + \frac{4}{29} \\ \text{if } x > \left(\frac{6}{29}\right)^3, \text{ then } f(x) = x^{\frac{1}{3}} \end{cases} \quad (23)$$

The function $f'$ is the derivative of $f$ with respect to $x$:

$$f'(x) = \begin{cases} \text{if } x \leq \left(\frac{6}{29}\right)^3, & \text{then } f(x) = \frac{841}{108} \\ \text{if } x > \left(\frac{6}{29}\right)^3, & \text{then } f(x) = \frac{1}{3}x^{\frac{-2}{3}} \end{cases} \quad (24)$$

This finally brings us to the actual metric definition:

$$\delta(A, T) = \sum_{i=1}^{N} (\vec{d}_i \cdot \vec{d}_i)^2. \quad (25)$$

The computation of the metric should be very fast, because only equations 14 and 25 are computed at runtime.

In recapitulation exemplary embodiments of a method for improving the color output of a printing device are disclosed. The method includes comparing a color space defined for electronic image data by a color dictionary of an Adobe® PostScript® application to one or more target color spaces using, for example, equations 14 and 25. If one of the one or more target color spaces results in a value for δ less than a threshold value, then the target color space is assigned to the image data. If multiple target color spaces yield δ's below the threshold value, the target color space yielding the lowest δ value is assigned to the image data.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. A computer-implemented method for processing image data in a printing device, wherein the method is implemented in the printing device, the method comprising:
   receiving a page description language (PDL) file including image data wherein the data includes an assigned color space of the data;
   comparing the assigned color space of the image data to a known color space; and
   processing the image data using the known color space in place of the assigned color space if a difference between the known color space and the assigned color space is below an acceptable threshold,
   wherein the difference between the assigned color space and the known color space is calculated based upon differences between N sample points in each space, where N is a positive integer, and wherein comparing the assigned color space to the known color space includes comparing the N sample points of the known space with the N sample points of the assigned space in a device-independent space.

2. The method of claim 1, wherein processing the image data using the known color space includes processing the image data using image processes tailored for the known color space.

3. The method of claim 1, wherein the assigned color space is assigned by a page description language (PDL) application.

4. The method of claim 1, wherein the assigned color space is only compared to known color spaces having same dimensions as the assigned color space.

5. A computer-implemented method for processing image data in a printing device, wherein the method is implemented in the printing device, the method comprising:
   receiving a page description language (PDL) file including image data wherein the data includes an assigned color space of the data;
   comparing the assigned color space of the image data to a known color space; and
   processing the image data using the known color space in place of the assigned color space if a difference between the known color space and the assigned color space is below an acceptable threshold, wherein the difference between the assigned color space and the known color space is calculated based upon differences between N sample points in each space, where N is a positive integer and where N is greater than or equal to 3 when the assigned space is a gray space.

6. A computer-implemented method for processing image data in a printing device, wherein the method is implemented in the printing device, the method comprising:
   receiving a page description language (PDL) file including image data wherein the data includes an assigned color space of the data;
   comparing the assigned color space of the image data to a known color space; and
   processing the image data using the known color space in place of the assigned color space if a difference between the known color space and the assigned color space is below an acceptable threshold, wherein the difference between the assigned color space and the known color space is calculated based upon differences between N sample points in each space, where N is a positive integer and where N is greater than or equal to 11 when the assigned space is a three-color space.

7. A computer-implemented method for processing image data in a printing device, wherein the method is implemented in the printing device, the method comprising:
   receiving a page description language (PDL) file including image data wherein the data includes an assigned color space of the data;
   comparing the assigned color space of the image data to a known color space; and
   processing the image data using the known color space in place of the assigned color space if a difference between the known color space and the assigned color space is below an acceptable threshold, wherein the difference between the assigned color space and the known color space is calculated based upon differences between N sample points in each space, where N is a positive integer and where N is greater than or equal to 19 when the assigned space is a four-color space.

* * * * *